United States Patent [19]
Yang

[11] Patent Number: 5,499,551
[45] Date of Patent: Mar. 19, 1996

[54] DOUBLE-ACTING TYPE DYNAMIC BACK CLEARANCE RELIEF DRIVING SYSTEM

[76] Inventor: Tai-Her Yang, No. 32 Lane 29, Taipin St., Si-Hu Town, Dzan-Hwa, Taiwan

[21] Appl. No.: 192,617

[22] Filed: Feb. 7, 1994

[51] Int. Cl.⁶ ............................. F16H 55/24; F16H 57/12
[52] U.S. Cl. ............................. 74/427; 74/409; 74/810.1
[58] Field of Search ........................ 74/427, 409, 810.1

[56]  References Cited

U.S. PATENT DOCUMENTS

| | | | |
|---|---|---|---|
| 1,369,442 | 2/1921 | Kauffman | 74/427 |
| 4,685,346 | 8/1987 | Brackett | 74/427 |
| 5,090,267 | 2/1992 | Gramling | 74/427 |
| 5,265,488 | 11/1993 | Yang | 74/427 |
| 5,392,666 | 2/1995 | Lin | 74/427 |

FOREIGN PATENT DOCUMENTS

| 544319 | 7/1957 | Canada | 74/427 |
|---|---|---|---|
| 508789A1 | 10/1992 | European Pat. Off. | 74/427 |

*Primary Examiner*—Charles A. Marmor
*Assistant Examiner*—Troy Grabow
*Attorney, Agent, or Firm*—Bacon & Thomas

[57]  ABSTRACT

The present invention relates to a double-acting type dynamic back clearance relief driving system having two sets of worm shafts coupled with a worm gear, one worm shaft set acting as a prime mover worm shaft and the other acting as a displacement control worm shaft. When the system is driving, one of the worm shaft sets is applied with faster rotary driving motion and always applies forces on the worm gear set. Another worm shaft set is a displacement control worm shaft coupled also with the worm gear set, or an individual worm gear set of the same pitch or different pitch to be locked upon the same shaft. The acting force to be applied constantly on the gear by the force applying worm shaft always causes the displacement control worm shaft to stress the worm gear reversely, and since the worm shaft is irreversibly driven, there is no clearance between the worm gear and the two worm shafts.

8 Claims, 3 Drawing Sheets

5,499,551

DOUBLE-ACTING TYPE DYNAMIC BACK CLEARANCE RELIEF DRIVING SYSTEM

SUMMARY OF THE INVENTION

The present invention relates to a double-acting type dynamic back clearance relief driving system comprising two sets of worm shafts coupled with a worm gear acting as a prime mover worm shaft and a displacement control worm shaft. While the system is driving, one of the worm shafts is applied with faster rotary driving and always applies forces on the worm gear. The other shaft is a displacement control worm shaft coupled also with this worm gear, or an individual worm gear of the same pitch or different pitch locked on the same shaft. The acting force is applied constantly on the gear by the force applying worm shaft which always causes the displacement control worm shaft to reversely stress on the worm gear. Since the worm shaft is irreversibly driving, there is no clearance between the worm gear and the two worm shafts accordingly. While the displacement control worm shaft is driven backwards to the pressing direction, the worm gear is driven by the force applying prime mover worm shaft to displace and chase up to pressing the displacement control worm shaft tightly again to form the dynamic back clearance relief driving system to regulate the speed difference automatically in accordance with the status of the back clearance of the load. It also allows changing the arrangement of the force application driving structure of the two worm shafts to cause the driving of the prime mover worm shaft to be rigid, and the driving of the displacement control worm shaft to be a torsion limiting mobile coupling driving with a faster revolving speed, The above irreversible driving component may also be constituted by a screw stem and nut set to drive a work table or other mechanism.

DETAILED DESCRIPTION OF THE PREFERRED EMBODIMENTS

Figure 1:
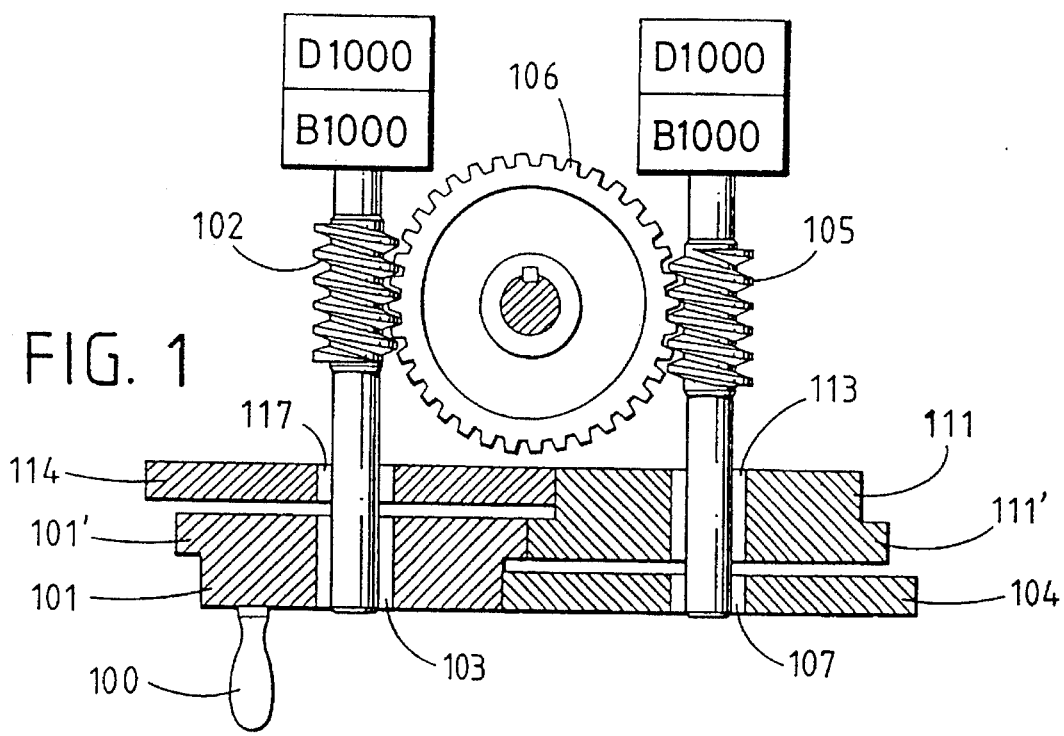
FIG. 1 is a schematic drawing of the present invention with a single power source double driving shaft combination driving on the double-acting type dynamic back clearance relief driving system.

The present invention relates to a double-acting type dynamic back clearance relief driving system comprising two worm shafts to be coupled with the worm gear, one acting as a prime mover worm shaft and the other as a displacement control worm shaft. While the system is driving, one of the worm shafts is applied with faster rotary driving and always applies a force on the worm gear. Another shaft is a displacement control worm shaft coupled with this worm gear, or the individual worm gear of the same pitch or different pitch locked on the same shaft. The acting force is applied constantly on the worm gear by the force applying worm shaft and always causes the displacement control worm shaft to reversely stress on the worm gear. Since the worm shaft is irreversibly driving, there is no clearance between the worm gear and the two worms shaft accordingly. While the displacement control worm shaft is driven backwards to the pressing direction, the worm gear is driven by the force applying prime mover worm shaft to displace and chase up to pressing the displacement control worm shaft tightly to form the dynamic back clearance relief driving system to regulate the speed difference automatically in accordance with the status of the back clearance of the load. Relatively, it also allows the change of the arrangement of the force application driving structure of the two worm shafts to cause the driving of the above prime mover worm shaft to be rigid, and the driving of the displacement control worm shaft to be a torsion limiting mobile coupling driving with a faster revolving speed to perform no clearance obverse and reversal revolving drive against the load worm gear jointly in order to attain dynamic back clearance relieving in motion. The above irreversible driving component may also be constituted by a screw stem and nut set to drive a work table or other mechanism.

The above system comprises:

An irreversible driving passive body and two motive bodies coupling with it to be used as power source, in which one motive body is a force application prime mover, and another is a displacement control prime mover. The feature is that the force application prime mover, or the displacement control prime mover performs an irreversible force application driving against the passive body. The above passive body may be a worm gear, and the force application prime mover and the displacement control prime mover may each be a worm shaft. The passive body may provide driving nut, and the force application prime mover and the displacement control prime mover may be a screw set (the interchangeable installation of the screw stem and nut of the prime mover and the passive body remains the same) to constitute a double-direction driving dynamic back clearance relief driving system to regulate the speed difference automatically based on the status of the back clearance of the load. The principle of action is described as follows.

The relationship between the force application prime mover, the displacement control prime mover, and the passive body includes: In static status, the force application prime mover and the displacement control prime mover are static; the force application prime mover presents pressing and closing status where is couples with the passive body; the displacement control prime mover presents retarding and closing status where it couples with the passive body resulting in the passive body having no back clearance status against the force application prime mover and displacement control prime mover; on driving displacement, one set of the worm shafts (or screw stem and nut set) may act as the prime mover against the pressing and closing surface with the displacement control prime mover, because the displacement control prime mover is at retarding and closing position with the passive body, and the passive body is irreversibly driving against the displacement control prime mover. Accordingly, a static pressure is formed on the closing position of the passive body and the displacement control prime mover. While the displacement control prime mover is controlled to slacken off backwards along the pressing direction, the passive body will perform pursuit driving based on the amount of the slackening off drive to form the double-acting type dynamic back clearance relief driving system to regulate the speed difference automatically in accordance with the status of the back clearance of load. While the displacement control prime mover comes to a halt, this system is on the original no back clearance still state; on driving reversely, the prime mover and control prime mover exchange function instantly, becomes the control prime mover and becomes the prime mover, no back clearance will be produced on the instant of the exchange of direction.

The power source of the above force application prime mover and displacement control prime mover may be a common power source, or separate independent power sources, in which the relationship between the driving speed B of the power source of the force application prime mover and the driving displacement speed C of the displacement control prime mover will be $B \geq C$ and it will regulate the speed difference automatically based on the status of the back clearance of the load, in which B includes a still state providing driving static pressure. Similarly, the relationship on reverse revolving will be $C \geq B$.

The way to constitute the above driving power is described as follows.

A single power source combination driving system is constituted by a single rotary power source including manpower, step motor, servo motor, common AC/DC motor and general mechanical control driving as well as the rotary driving kinetic energy of a fluid motor, etc. The feature is that the power coming from the rotary power source is distributed by the gear system to be transmitted to the prime mover, to cause the revolving speed to actuate the passive body to be higher than the revolving speed to be transmitted to the displacement control prime mover to actuate the passive body. The rotary power to be transmitted to the prime mover is coupled with a sliding rotary coupling device via a mechanical or an electromagnetic radial or axial structure allowing selecting of the coupling torsion and distributes automatically the speed difference of the prime mover in the system and the displacement control prime mover.

An individual power source separate driving system features (1) two driving motors acting as prime movers have controllable torsion driving running; (2) the driving revolving speeds of the prime mover and control prime mover are different, the latter being slower. The way to control torsion and speed difference includes an electric control by electric current or mechanical control. The driving method of the displacement control prime mover may include step motor, servo motor, common AC/DC motor, general mechanical control driving, and the rotary driving kinetic energy of a fluid motor, etc.

FIG. 1 is an embodiment of a single power source having pinion gear 101 acting as prime mover with a handle (or receiving mechanical driving) which rotates in the same direction as the prime mover worm shaft 102 by means of a limiting torsion mobile coupling device 103. The pinion gear 101 couples with the reverse reduction gear 104 to produce reduction and reverse rotating power. It couples and is driven by a single direction driving device 107 to drive the displacement control worm shaft 105. The reduction gear 104 drives reversely to drive further the worm gear set 106 with the prime mover worm shaft 102 in common to produce the double-acting type dynamic back clearance relief driving to regulate the speed difference automatically in accordance with the status of the back clearance of load. The displacement control worm shaft 105 is coupled with a second prime moving intermediate pinion 111' to further couple with the displacement control worm shaft 105, by means of a limiting torsion mobile coupling device 113. The intermediate pinion 111', is linked to pinion gear 111 which is coupled to the reverse reduction gear 114 which is coupled on the other worm shaft 102 by a single direction driving device 117. The worm shaft 105 is reversed when the reduction gear 114 drives reversely, which drives further reversely against the worm shaft set 106 by the displacement driving worm shaft 105 to cause the two worm shafts 102, 105 to exchange functions. The thrusting surfaces and the retarding surfaces of the worm gears exchange function simultaneously without back clearance in reverse direction, to form the double-acting type dynamic back clearance relief driving to regulate the speed difference automatically based on the status of the back clearance of the load. There is a driving intermediate gear 101' additionally between the above first prime mover pinion gear 101 and the second prime mover pinion gear 111 to couple with the intermediate gear 111' mutually (or providing intermediate gear or constituted by other driving component). The two gears present the relationship of reverse driving to drive the worm gear respectively once the handle 100 is driven obversely or reversely. The above limiting torsion mobile coupling device may include electromagnetic type, mechanical type, and selecting required mutually driving components based on the type of structural space, such as umbrella gear, straight gear, or other driving components, and intermediate gear set may be added if desired. Relatively, the arrangement of the force application structure of the two worm shaft sets may also be changed to cause the driving of the above prime mover worm shaft to be rigid, and the driving of the displacement control worm shaft becomes limiting torsion mobile coupling driving with faster revolving speed to perform observe and reverse driving without clearance against the load worm gear with the displacement control worm shaft jointly.

Worm inertia restraint auxiliary retarding device D1000 may be constituted by a mechanical sliding friction type flow force retarding type, or an electromagnetic eddy current retarding type. The device may be installed depending upon the requirement of the system to assure that the retardation is larger than the inertia of the worm shaft and restrains the inertia of the worm shaft effectively whenever the power source from the driving system comes to a halt or slows down. The worm shaft inertia restraint auxiliary retarding device D1000 is installed between one end of the two worm shafts and the still casing.

Still braking auxiliary device B1000 is an auxiliary braking device to be controlled mechanically, by means of flow force, or an electromagnetic control depending upon specific requirements, in order to perform the action of braking during a long-lasting still state of the system to assure the close fitting of the worm shaft and the worm wheel without being loosened by external forces. The still braking auxiliary device B1000 is installed between one end of the two worm shafts and a still casing.

Figure 2:
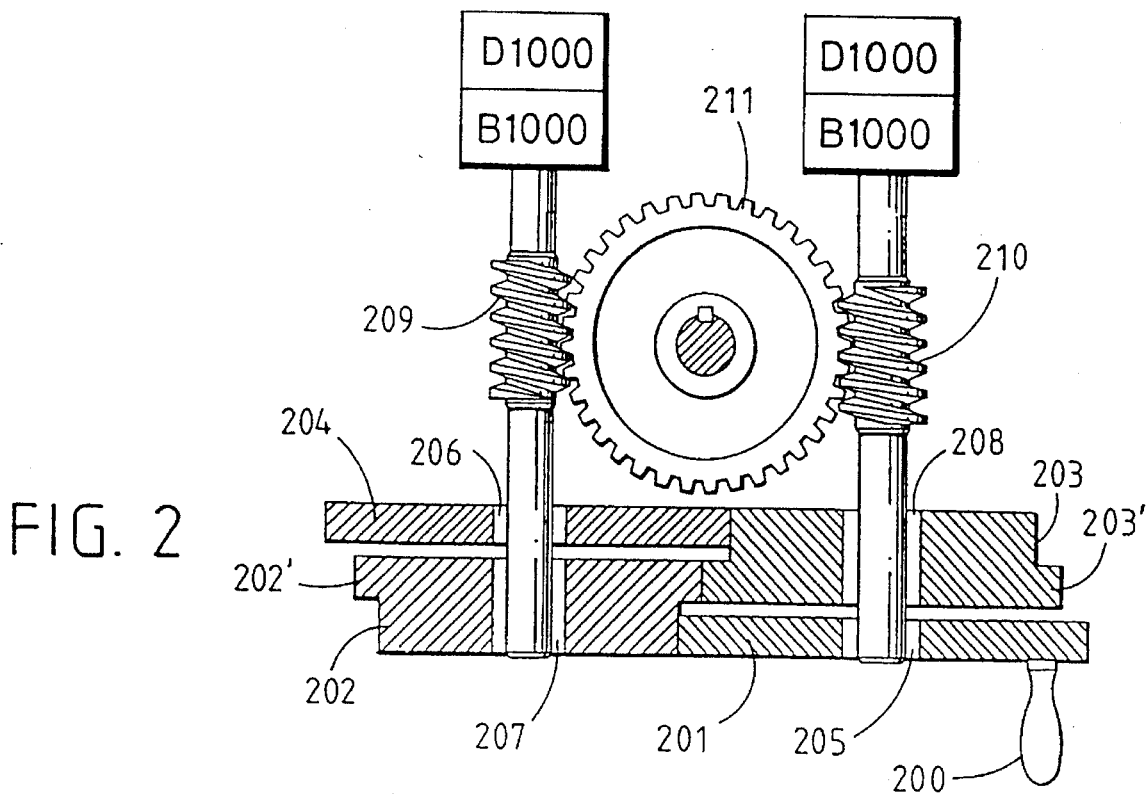
FIG. 2 a schematic drawing of the present invention with a double-acting type dynamic back clearance relief driving system by means of the prime mover worm shaft rigid driving displacement control worm shaft to present a higher speed torsion limiting mobile coupling drive.

FIG. 2 shows an embodiment of the prime mover worm shaft rigid driving displacement control worm shaft having a higher speed limiting torsion mobile coupling driving to form a double-acting type dynamic back clearance relief driving system. The system shown in FIG. 2 regulates the distribution gear system between the operation input side as stated in FIG. 1 and the two sets of worm shafts to cause the relationship between the driving speed B of the power source of the force application prime mover and the driving displacement speed C of the displacement control prime mover to be B ≧C. The speed difference is regulated automatically based on the status of the load back clearance, in which B includes presenting a still status to provide static pressure. On reversing, the relation will be C ≦B.

The way to constitute the above driving power is described as follows.

Individual power source separate type driving system: The features of structure are: (1) the two driving motors acting as prime mover have controllable torsion while running; (2) the driving revolving speeds of the prime mover and the control prime mover are different, the latter is faster. The way to control torsion and control the speed difference may include electric control and/or mechanical control. The control prime mover may include a step motor, servo motor, common AC/DC motor, general mechanical control driving, and the rotary driving kinetic energy, such as a fluid motor, etc.

A single power source combination type driving system is constituted by a single rotary power source which may include the rotary driving kinetic forces from manpower, a step motor, a servo motor, ordinary AC/DC motor, general mechanical control and driving, and a fluid motor. The features are that the rotary power source worm gear system causes the revolving speed to be transmitted to the prime mover and to actuate the passive body to a speed lower than the revolving speed to be transmitted to the displacement control prime mover to actuate the passive body. The rotary power to be transmitted to the displacement control prime mover is coupled with the mobile rotary coupling device via a mechanical or electromagnetic type radial or axial structure selective coupling torsion which distributes automatically the speed difference between the prime mover in the system and the displacement control prime mover.

The structure shown in FIG. 2 is constituted chiefly by:

The bull gear 201 acts as prime mover input via an attaching handle or by receiving a mechanical driving force, to rotate in the same direction of the prime mover worm shaft 210 by coupling with the driving prime mover worm shaft 210 by means of a single direction driving device 205. The reverse acceleration gear 202 coupled with the bull gear 201 produces acceleration and reverse rotating power to drive a limiting torsion mobile coupling device 207 to rotate displacement control worm shaft 209 reversely. It drives further the worm gear set 211 together with the prime mover worm shaft 210 to produce the double-acting type dynamic back clearance relief driving to regulate the speed difference automatically based on the load back clearance. The displacement control worm shaft 209 is provided with a second prime mover intermediate gear 202 linked with the acceleration gear 202, which is coupled with the displacement control worm shaft 209 by means of a limiting torsion mobile coupling device 207.

The intermediate gear 202' engages an intermediate gear 203' on the prime mover worm shaft 210. The intermediate gear 203' is linked with the pinion gear 203 and coupled to the prime mover worm shaft 210 by means of limiting torsion mobile device 208. The linked pinion gear 203 applies reduced and reverse rotary power to the reverse reduction gear 204 coupled with worm shaft 209. Coupling drive of single direction driving device is provided between the reduction gear 204 and worm shaft 209 to drive the worm shaft 209 when the reduction gear 204 drives reversely and the worm shaft drives the worm gear set 211 reversely to cause the two worm shafts 210, 209 to exchange functions. The thrust surface and retarding surface of the worm gears will be exchanged simultaneously without direction replacing back clearance to perform the double-acting type dynamic back clearance relief driving to regulate the speed difference automatically based on the load back clearance.

Worm inertia restraint auxiliary retarding device D 1000 is constituted by the accustomed retarding device, such as a mechanical sliding friction type flow force retarding type, or an electromagnetic eddy current retarding type. The device may be installed depending upon the requirement of the system to assure that the retardation is larger than the inertia of the worm shaft during the driving of the worm shaft and to restrain the inertia of the worm shaft effectively whenever the power source from the driving system comes to a halt, or slows down. The worm shaft inertia restraint auxiliary retarding device D1000 is installed between one end of the two worm shafts and a still casing.

Still braking auxiliary device B1000 is an auxiliary braking device controlled mechanically by means of fluid force, or by electromagnetic control installed, depending upon specific requirements, to perform the action of braking during long-lasting still state of the system to assure the close fitting of the worm shaft and the worm wheel and to prevent loosening by external forces. The still braking auxiliary device B1000 is installed between one end of the two worm shafts and a still casing.

Figure 3:
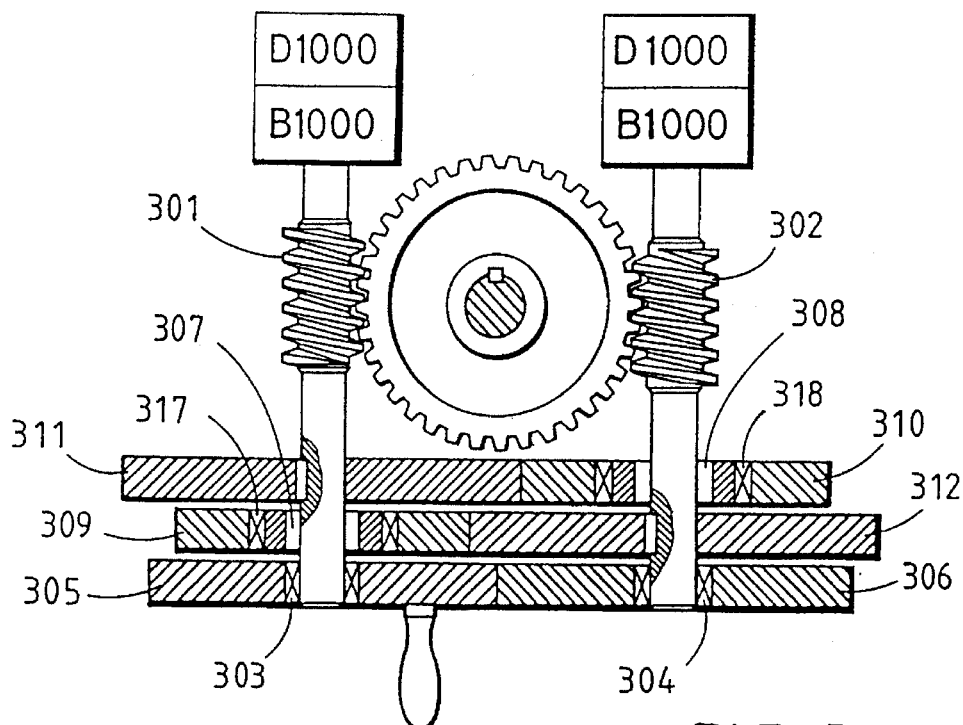
FIG. 3 is a schematic drawing of the present invention with a single power source combination driving.

FIG. 3 shows an embodiment of the separating type gear train of the single power source combination type driving system.

The active worm shaft 301 and displacement control worm shaft 302 are coupled with the driving gears 305, 306 by one way driving devices 303, 304. Driving gears 309, 310 are provided with torsion restricting movable devices 307, 308. One way driving device 317 is provided between the driving gear 309 and the torsion restricting device 307. In addition, one way driving device 318 is also provided between the driving gear 310 and the torsion restricting device 308. The prime mover worm shaft 301 and the displacement control worm shaft 302 are fixed to the driving gears 311, 312 respectively with a key or by other means. The driving gears 311, 310 are coupled with the driving gear 310 having a smaller diameter than the driving gear 311. The driving gears 309 and 312 are coupled with each other with the driving gear 309 having a smaller diameter than the driving gear 312. The driving gears 305 and 306 are coupled with each other to drive in equal speed.

The mutual coupling of the driving gear sets 305, 306 between the prime mover worm shaft 301 and the displacement control worm shaft 302 via the single way driving devices 303, 304, allows in one direction one of the gear sets to act as an input to transmit motive force to the worm shaft, while the other gear set will be idle. The action will be contrary in a reverse rotation.

The driving gear 309 on the prime mover worm shaft 301 is coupled with the prime mover active worm shaft 301 by means of a torsion restricting movable device 307 and a one way driving device 317. The gear 309 is also coupled with the gear 312 fixed on the follower worm shaft 302.

The driving gear 310 on the follower worm shaft 302 is coupled with the follower worm shaft 302 by means of torsion restricting movable device 308 and one way driving device 318. The gear 310 is also coupled with the gear 311 fixed on the prime mover worm shaft 301.

Worm inertia restricting auxiliary retardation device D1000 is constituted by the accustomed retarding devices, such as mechanical slipping friction type, flow force retarding type, or electromagnetic eddy current retarding type. The device may be installed depending on the requirements of the system to assure that the retardation will be larger than the rotating inertia of the worm shaft, in order that the worm shaft inertia will be restricted effectively when the power supply from the driving system is interrupted or in the course of a specific slowdown. The worm inertia restricting auxiliary retardation device D1000 is installed between one end of the two worm shafts and the still casing.

Still braking auxiliary device B1000 is the auxiliary braking device controlled mechanically, by fluid force or by electromagnetic control to be installed depending on specific requirements to effect braking while the system stays in still state for a long time in order to assure that the close fitting of the worm shaft and the worm gear will prevent loosening by external forces. The still braking auxiliary device B1000 is installed between one end of the two worm shafts and the still casing.

Figure 4:
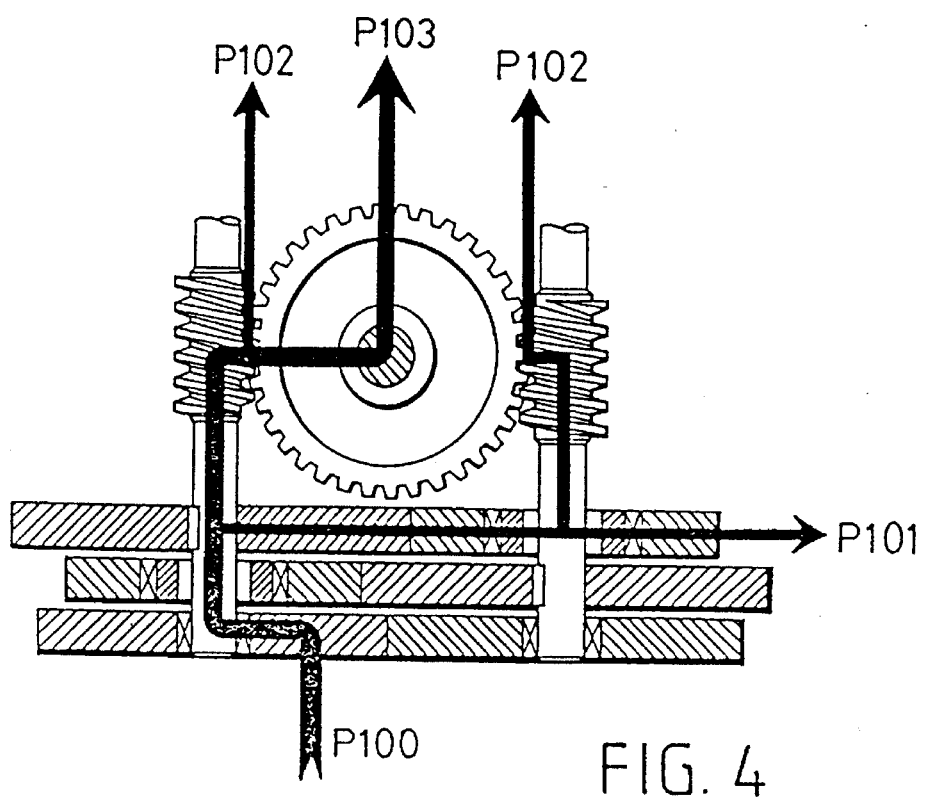
FIG. 4 is a schematic drawing of the distribution of the power of the obverse rotation driving of the embodiment shown in FIG. 3.
Figure 5:
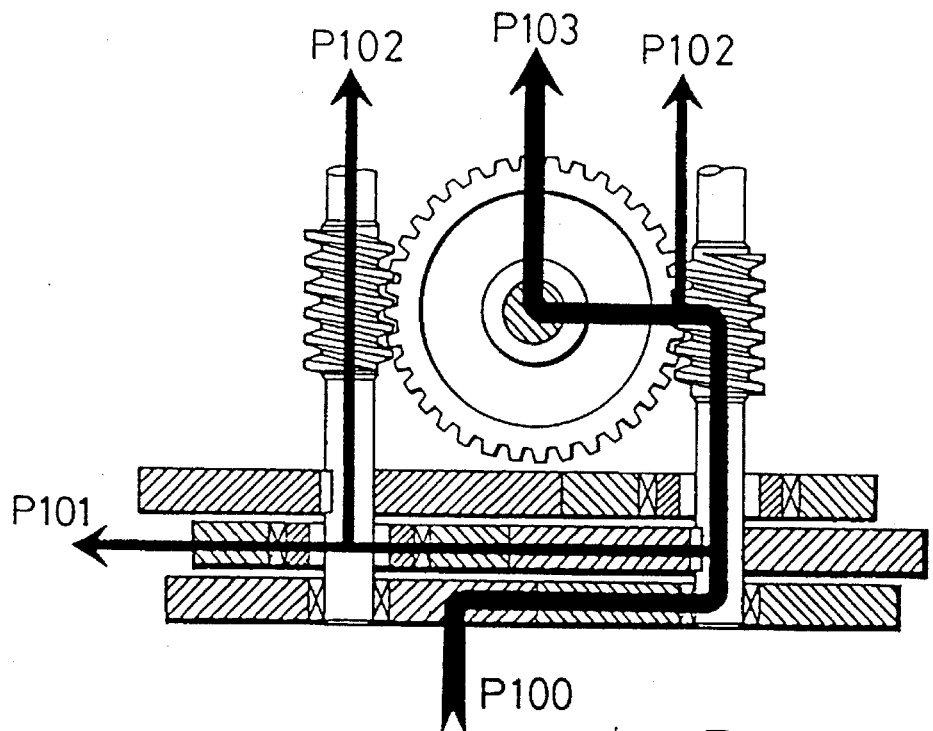
FIG. 5 is a schematic drawing of the distribution of the power of the reverse rotation driving in the embodiment shown in FIG. 3.

FIG. 4 is a schematic drawing of the distribution of power on the obverse driving of the single power source combination driving gear train as shown in FIG. 3. FIG. 5 is the schematic drawing of the distribution of power on the reverse driving of the single power supply combination driving gear train as shown in FIG. 3. The direction of the flow of power is shown in the arrow in the drawing, in which P100 is the driving input power, P101 is the power loss of the torsion restricting movable device, P102 is the power loss of the worm shaft worm gear set, and P103 is the output power.

Figure 6:
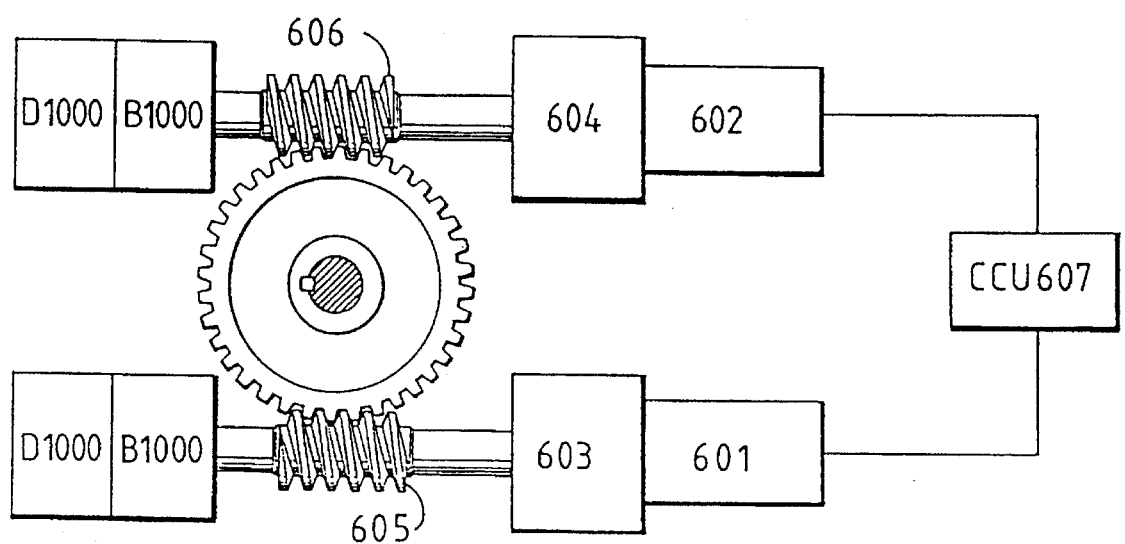
FIG. 6 is a schematic drawing of the present invention with an individual power source separation driving of the double-acting type dynamic back clearance relief driving system.

FIG. 6 is an embodiment of individual power source separate type driving system of the present invention. The two torsion sets act as a prime mover shaft and a displacement control worm shaft. The worm gear sets are driven directly by two separate torsion and revolving speed controllable rotary power units respectively or via a transmission mechanism. The two rotary power units, worm shaft sets and the controlled relations of transformation and torsion provide the following features.

Rotary power units 601 and 602 are coupled with worm shaft sets 605 and 606 directly or via transmission devices 603 and 604 and constitute power units of a pneumatic or fluid actuation type, or an electric driving AC/DC motor.

Control unit CCU607 controls the two power units to provide the following features.

(1) The output revolving speed is controllable, the revolving speed and torsion provide for regulation of the speed based on the load, i.e., the bigger the output torsion, the lesser the revolving speed.

(2) The output torsion is controllable, and the torsion against the load will be retained on overloading.

(3) Two rotary power units receive the control of rotary direction and torsion from the control unit The control of the two rotary power units performs relative rotary direction output and unequal speed proportional revolving speed output based on the double-acting type dynamic back clearance relief driving system to decide the absolute driving speed of the worm shaft and worm gear set with slower revolving speed, and forms the feature of obverse and reverse exchanging of direction with no clearance while in motion or the stationary state of the double-acting type dynamic back clearance relief driving system.

The following auxiliary device may be added in the above structure further to improve the stability in various driving states.

Worm inertia restraint auxiliary retarding device D1000 is constituted by the accustomed retarding device, such as a mechanical sliding friction type, flow force retarding type, or an electromagnetic eddy current retarding type. The device may be installed depending upon the requirement of the system to assure that the retardation is larger than the rotating inertia of the worm shaft to restrain the inertia of the worm shaft whenever the power source from the driving system comes to a half, or in the course of a specific slowdown. The worm shaft inertia restraint auxiliary retarding device D1000 is installed between one end of the two worm shafts and the still casing.

Still braking auxiliary device B1000 is an auxiliary braking device to be controlled mechanically, by means of flow force, or electromagnetic control installed depending upon requirements in order to perform the action of braking during long-lasting still state of the system to assure the close fitting of the worm shaft and the worm wheel to prevent loosening by external forces. The still braking auxiliary device B1000 is installed between one end of the two worm shafts and still casing.

In addition, to the structure as described in FIGS. 1–6, the practical embodiment of this invention allows also the coupling of two sets of upper and bottom worm gears with an individual worm shaft set respectively. The upper and bottom worm gear sets are combined together on the same spindle. The above two worm shaft sets constitute the prime mover worm shaft and displacement control worm shaft respectively and drive without clearance in obverse and reverse revolving as well as still state and motion just the same a the two worm shaft sets in the embodiment shown in FIGS. 1–6. The worm shafts may be parallel or at other angles depending upon the specific requirements of the structure.

The relatively driving displacement structure of the double-acting type dynamic back clearance relief driving system allows the installation of an angle displacement controlling device in order to reinforce the convenience of operation.

Except for the angle displacement regulation of a rotary working table mechanism, the application of the double-acting type dynamic back clearance relief driving system should include the no back clearance double direction driving of angle displacement for another mechanism or mechanical device.

What is claimed is:

1. A double-acting type dynamic back clearance relief driving system comprising:
   a) first and second worms, each worm having a worm shaft;
   b) a toothed element engaging both of the worms such that rotation of the worms causes movement of the toothed element;
   c) drive means to rotate the first and second worms in opposite directions at different speeds, the drive means comprising:
      i) a first input gear attached to the first worm shaft by a first one way driving device;
      ii) a second gear engaged with the first input gear and attached to the second worm shaft by a second one way driving device;
      iii) a third gear attached to the first worm shaft by a third one way driving device;
      iv) a fourth gear fixedly attached to the second worm shaft so as to rotate therewith and engaged with the third gear;
      v) a fifth gear fixedly attached to the first worm shaft so as to rotate therewith; and vi) a sixth gear attached to the second worm shaft by a fourth one way driving device and engaged with the fifth gear;

whereby rotation of the first input gear in the first direction causes rotation of the first worm in the first direction and rotation of the second worm in a second, opposite direction at a slower speed than the first worm, and rotation of the first input gear in the second, opposite direction causes rotation of the first worm in the second direction and rotation of the second worm in the first direction at a speed higher than that of the first worm.

2. The double-acting dynamic back clearance relief driving system of claim 1 further comprising:
 a) a first torsion restricting movable device mounted between the third one way driving device and the first worm shaft; and
 b) a second torsion restricting movable device mounted between the fourth one way driving device and the second worm shaft.

3. The double-acting dynamic back clearance relief driving system of claim 1 wherein the toothed element comprises a rotatable worm gear.

4. The double-acting dynamic back clearance relief driving system of claim 1 wherein a diameter of the first input gear is substantially equal to a diameter of the second gear.

5. The double-acting dynamic back clearance relief driving system of claim 1 wherein a diameter of the third gear is less than a diameter of the fourth gear.

6. The double-acting dynamic back clearance relief driving system of claim 1 wherein a diameter of the fifth gear is greater than a diameter of the sixth gear.

7. The double-acting dynamic back clearance relief driving system of claim 1 further comprising an inertia restricting device connected to the first and second worm shafts.

8. The double-acting type dynamic back clearance relief driving system of claim 7 further comprising an auxiliary braking device connected to the first and second worm shafts.

* * * * *